(12) United States Patent
Kompella et al.

(10) Patent No.: US 9,992,218 B2
(45) Date of Patent: Jun. 5, 2018

(54) METHOD AND SYSTEM FOR MANAGING COMPLIANCE OF ONE OR MORE NETWORK DEVICES

(71) Applicant: Wipro Limited, Bangalore (IN)

(72) Inventors: Anasuya Devi Kompella, Bangalore (IN); Asif Husainsaheb Jamadar, Belgaum (IN); Anand Raj Jha, Kanpur (IN)

(73) Assignee: WIPRO LIMITED, Bangalore (IN)

(*) Notice: Subject to any disclaimer, the term of this patent is extended or adjusted under 35 U.S.C. 154(b) by 113 days.

(21) Appl. No.: 14/813,316

(22) Filed: Jul. 30, 2015

(65) Prior Publication Data

US 2016/0352640 A1 Dec. 1, 2016

(30) Foreign Application Priority Data

Jun. 1, 2015 (IN) .......................... 2758/CHE/2015

(51) Int. Cl.
*G06F 15/16* (2006.01)
*H04L 29/06* (2006.01)
*H04L 12/24* (2006.01)

(52) U.S. Cl.
CPC ...... *H04L 63/1433* (2013.01); *H04L 41/0866* (2013.01); *H04L 63/20* (2013.01); *H04L 41/0813* (2013.01); *H04L 41/0893* (2013.01); *H04L 41/12* (2013.01)

(58) Field of Classification Search
CPC ............. H04L 63/0263; H04L 63/1408; H04L 41/082; H04L 41/0823; H04L 41/0869; H04L 41/5019; H04L 41/0893; H04L 63/1433; H04L 41/0803; H04L 41/0853; H04L 41/0813; H04L 63/20
See application file for complete search history.

(56) References Cited

U.S. PATENT DOCUMENTS

| | | | |
|---|---|---|---|
| 8,458,301 B1* | 6/2013 | Andrus | H04L 41/0816 709/220 |
| 2014/0122669 A1* | 5/2014 | Ennis, Jr. | H04L 41/0853 709/220 |
| 2016/0057168 A1* | 2/2016 | Reddock | H04L 63/0263 726/1 |
| 2016/0371491 A1* | 12/2016 | Kacherov | H04L 63/20 |

* cited by examiner

*Primary Examiner* — Djenane Bayard
(74) *Attorney, Agent, or Firm* — Finnegan, Henderson, Farabow, Garrett & Dunner, LLP

(57) ABSTRACT

Embodiments of the present disclosure disclose a method and a device for managing compliance of one or more network devices. The method comprises receiving one or more configuration changes of the one or more network devices. Also, the method comprises identifying each configuration change as one of a compliant configuration change and a non-compliant configuration change by correlating, the one or more configuration changes using a first set of parameters. Further, the method generating an impact value of the one or more configuration changes and generating a recommendation for the one or more network devices based on the impact value.

19 Claims, 4 Drawing Sheets ial." Any implementation or aspect described herein as "exemplary" is not necessarily to be construed as preferred or advantageous over other implementations or aspects.

METHOD AND SYSTEM FOR MANAGING COMPLIANCE OF ONE OR MORE NETWORK DEVICES

PRIORITY CLAIM

This U.S. patent application claims priority under 35 U.S.C. § 119 to: Indian Application No. 2758/CHE/2015, filed on Jun. 1, 2015. The aforementioned application is incorporated herein by reference in its entirety

TECHNICAL FIELD

The present subject matter is related, in general to network device compliance management and more particularly, but not exclusively to systems and methods for managing compliance of one or more network devices in real time.

BACKGROUND

As per a recent analysis reports, 60-80% of network outages are due to incorrect configuration changes of network devices. Also, with the increasing scale and complexity of the network in an enterprise, maintaining secure configurations or compliance management of the network devices by way of firewalls, switches and routers has become a challenge. Further, an enterprise with a multi-vendor multi-product scenario maintaining security compliance has become tougher. To overcome these scenarios, the enterprises use expertise of auditors for interpreting human errors and right skills professionals in managing the configurations.

Presently, the available solutions for compliance management of configuration changes on the network devices have at least one drawback such as, but not limited to, detecting the policy violations in real-time; complete coverage irrespective of number, make and model of a device; maintaining devices anytime audit-ready, maintaining secure configurations all time; monitoring continuously a policy violation and unauthorized changes, providing recommendation to fix a policy violation automatically and uniform application of security policy for all the network devices without having to rely on individual skills.

Hence, there exists a need to have a mechanism for managing compliance of one or more network devices in real time.

SUMMARY

Disclosed herein is a method and device for managing compliance of one or more network devices. The method comprises receiving one or more configuration changes of the one or more network devices. Then, identifying each configuration change, generating an impact value for the configuration change and generating a recommendation for the one or more network devices based on the impact value.

In an aspect of the present disclosure, a method for managing compliance of one or more network devices is provided. The method comprises receiving one or more configuration changes of the one or more network devices. Then, the method comprises identifying each configuration change as one of a compliant configuration change and a non-compliant configuration change. Further, the method comprises generating an impact value of the one or more configuration changes and generating a recommendation for the one or more network devices based on the impact value.

In an embodiment of the present disclosure, compliance management computing device for managing compliance of one or more network devices is provided. The compliance management computing device comprises a processor and a memory communicatively coupled to the processor. The memory stores processor-executable instructions, which, on execution, cause the processor to receive one or more configuration changes of the one or more network devices, identify each configuration change as one of a compliant configuration change and a non-compliant configuration change, generate an impact value of the one or more configuration changes and generate a recommendation to the one or more network devices based on the impact value.

In another aspect of the present disclosure, a non-transitory computer readable medium is disclosed. The non-transitory computer readable medium includes instructions stored thereon that when processed by a processor causes a device to perform operations comprising receiving one or more configuration changes of the one or more network devices. The operations further comprise identifying each configuration change as one of a compliant configuration change and a non-compliant configuration change. The operations further comprise generating an impact value of the one or more configuration changes and generating a recommendation for the one or more network devices based on the impact value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

DETAILED DESCRIPTION

Figure 1:
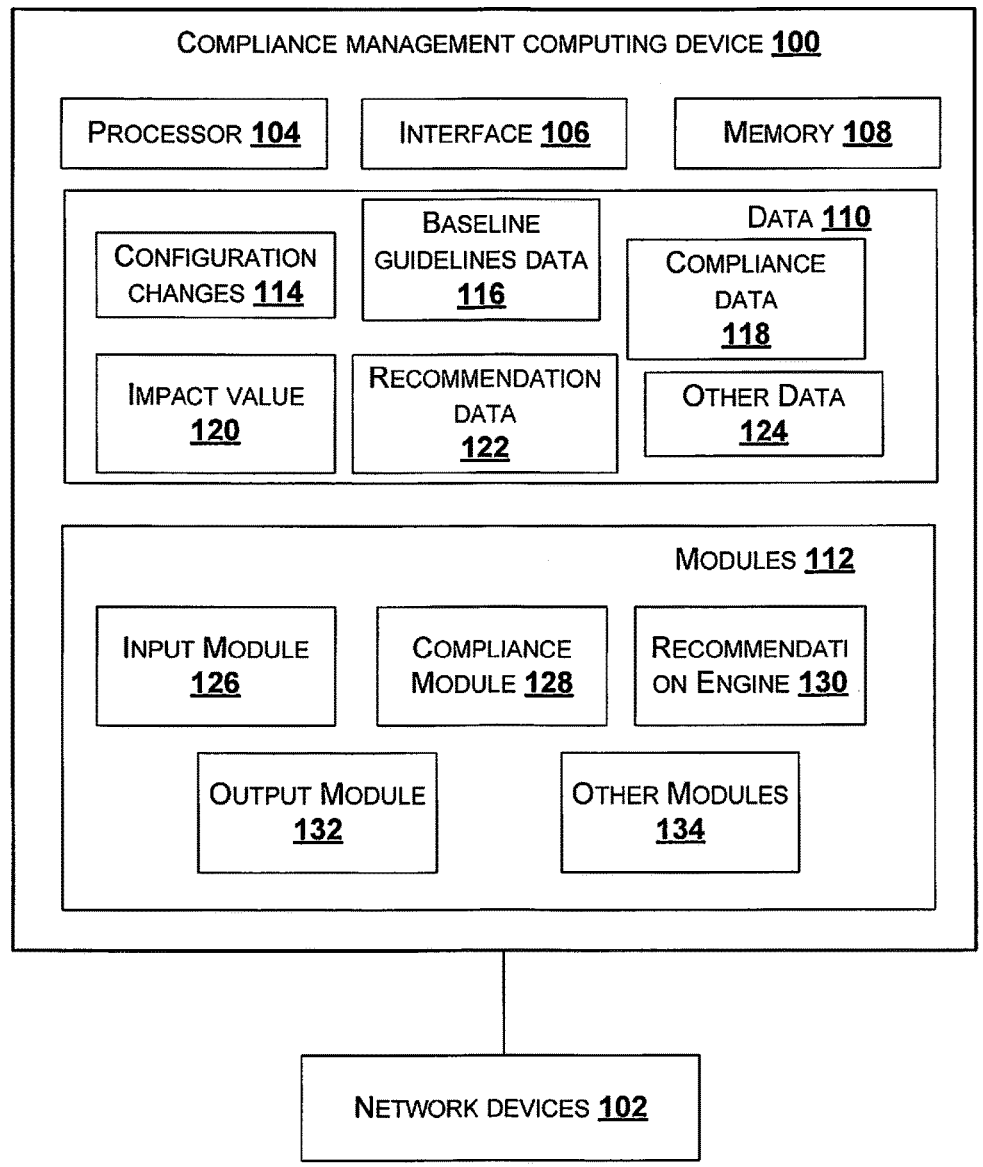
FIG. 1 illustrates a block diagram of an exemplary compliance management computing device for managing compliance of one or more network devices in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

Embodiments of the present disclosure are related to a method and a computing device for managing compliance of one or more network devices. The device receives configuration changes from one or more network devices and identifies each configuration change to generate an impact value. Further, the device generates a recommendation for the one or more network devices based on the impact value.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of an exemplary compliance management computing device or compliance management device 100 for managing compliance of one or more network devices in accordance with some embodiments of the present disclosure. The compliance management computing device 100 is communicatively connected to one or more network devices 102. Examples of the one or more network devices 102 may include, but not limited to, router, switch, firewall and any other network device. It may be understood by a person skilled in the art that any other network device can be used with method of the present disclosure.

The compliance management device 100 may include at least one central processing unit ("CPU" or "processor") 104 and a memory 108 storing instructions executable by the at least one processor 104. The processor 104 may comprise at least one data processor for executing program components for executing user- or system-generated requests. A user may include a person, a person using a device such as those included in this disclosure, or such a device itself. The memory 108 is communicatively coupled to the processor 104. In an embodiment, the memory 108 stores one or more impact values associated with the configuration changes of one or more network devices for managing compliance of one or more network devices. The compliance management device 100 further comprises an I/O interface 106. The I/O interface 106 is coupled with the processor 104 through which the input is received.

In an embodiment, one or more data 110 may be stored within the memory 108. The one or more data 110 may include, for example, configuration changes 114, baseline guideline data 116, compliance data 118, impact value 120, recommendation data 122 and other data 124.

The configuration changes 114 are the input from the network devices 102. The configuration changes 114 performed on the network devices are captured as events. For example, each of the configuration changes or events captured is one of change in password encryption/encoding method and change in a security setting of a network device. The configuration changes performed on the network devices are captured as events which comprises at least one of a configuration change identifier, an actual command executed, time of the configuration change and originator of the configuration change.

In one embodiment, the configuration changes may be performed by multiple means on the network devices such as, but not limited to, manually by an administrator of an enterprise either directly using a console or a tool or automatically by executing a script. Also, the configuration changes on the network devices are received by the compliance management system using at least one protocol such as, but not limited to, syslog and simple network management protocol (SNMP).

The baseline guideline data 116 is associated with a secure configuration of the network devices. In one embodiment, the baseline guideline data 116 is associated with best practices of specific industries and vendors for maintaining secure configurations of the network devices, and are compiled together. The baseline guideline data 116 comprises one or more rules and mapping of the best practices of one of an individual vendor and the network devices associated with the secure configuration. In one embodiment, baseline guideline data 116 comprises data associated with an organization security policy, which is specific to an enterprise and may be used for localizing a set of rules represented by baseline guidelines. A second set of parameters is associated with the organization security policy and the baseline guideline rules corresponding to the one or more network devices.

The compliance data 118 is an associated data with the configuration change events for compliance with organization security and change management policy. The rules are created in a semantic layer and are mapped to each network device. The security policy and baseline guidelines are mapped to the semantic layer. The semantic layer performs as a bridge between generic policy/guidelines definition in natural language and actual machine-process instructions, which are specific to a network device make and model. In one embodiment, a rule engine derives a specific rule that is applied for the configuration changes to determine a compliance status.

The impact value 120 is generated using the configuration changes. The impact value is generated by obtaining a critical value associated with the one or more network devices. The critical value is obtained by analyzing the configuration changes using predefined parameters and based on a violation severity value, or a probability of vulnerability exploited by one or more malicious elements. The predefined parameters comprise first set of parameters and third set of parameters. The first set of parameters is at least one of make and model of the network device. The third set of parameters is at least one of network connectivity, neighboring devices configuration, network device having internal facing or external facing and enrooting a network device to provide critical business services.

The recommendation data 122 is generated from an historical data associated with the impact value of the one or more network devices.

In an embodiment, the data 110 in the memory 108 is processed by the modules 112 of the processor 104. The modules 112 may be stored within the memory 108. Also, the modules can be implemented in any suitable hardware, software, firmware, or combination thereof.

In one implementation, the modules may include, for example, an input module 126, a compliance module 128, a recommendation engine 130, and an output module 132. The compliance management computing device 100 may also comprise other modules 134 to perform various miscellaneous functionalities of the device 100. It will be appreciated that such aforementioned modules may be represented as a single module or a combination of different modules.

In an embodiment, the input module 126 receives input data or one or more configuration changes 114 from the one or more network devices 102. The input data 124 received by the input module 124 is one or more configuration changes from the one or more network device 102. The one or more configuration changes 114 are referred as configuration changes.

The one or network devices 102 also referred as network devices 102, communicate to the compliance management computing device through the input module 126. The network devices 102 are computing devices such as, but not limited to router, switch, firewall and any other network device capable of computing. In one embodiment, the configuration changes on the network devices may be performed by multiple means such as, but not limited to, manually by an administrator of an enterprise either directly using a console or a tool or automatically by executing a script. The configuration changes performed on the network devices are transmitted to the compliance management computing device through at least one protocol such as, but not limited to, syslog and simple network management protocol (SNMP). Each of the one or more configuration changes is associated with at least one of a configuration change identifier, an actual command executed, time of the configuration change and originator of the configuration change.

The input module 126 comprises a database having baseline guideline data 116 associated with a secure configuration of the network devices. The baseline guideline data 116 comprises one or more rules and mapping of the best practices of one of an individual vendor and the network devices associated with the secure configuration. Also, baseline guideline data 116 comprises data associated with an organization security policy, which is specific to an enterprise and may be used for localizing a set of rules represented by baseline guidelines. It may be understood that at least one or a combination of multiple systems can be used with the present disclosure.

Figure 2:
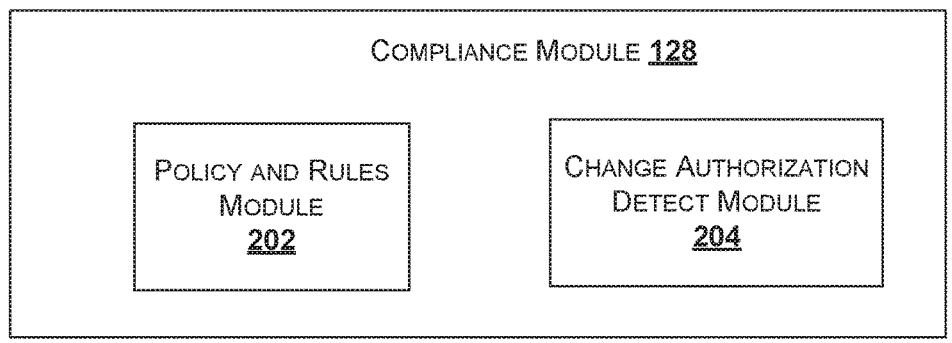
FIG. 2 illustrates an exemplary block diagram of a compliance module in accordance with some embodiments of the present disclosure.

The input module 126 provides the input data 114 available to the compliance module 128 for identifying each configuration change as one of a compliant configuration change and a non-compliant configuration change. This is performed by correlating the one or more configuration changes using a first set of parameters. The sub modules of the compliance module 128 are illustrated in FIG. 2. The sub modules of the compliance module 128 comprise a policy and rules module 202 and a change authorization detection module 204.

The policy and rules module 202 receives the configuration changes and the baseline guidelines data from the input module 126. The policy and rules module 202 creates and maintains generic repository of compliance rules. The compliance rules are created in a semantic layer first to determine whether each of the configuration change is one of compliance and non-compliance configuration change, by mapping with each of the network devices first set of predefined parameters. The first set of predefined parameters is at least one of make and model of the network device. Also, an organization security policy and baseline guidelines are mapped to the semantic layer. The policy and rules module applies a specific rule a configuration change and provides compliance status that is one of compliance and non-compliance.

In one embodiment, the make and model of the network device is identified by correlating the network device id comprising one of network device name and IP address, with an asset database or querying the network device. Using, the network device make, model and configuration changes, the rule to be applied for the configuration change or event is identified. Each rule of the policy and rules module 202 defines one of presence and absence of a pattern for detecting compliance or non-compliance of the configuration change.

The change authorization detect module 204 or also referred as change authorization detector, analyzes configuration change and resultant impact, to take an appropriate decision. Also, the change authorization detector 204 receives at least one ticket raised for a configuration change and correlates with the actual change configuration change or event received, to identify an unauthorized change. The at least one ticket raised for a configuration change is provided by at least one ticket management system. In one embodiment, if the change event or configuration change is found to be non-compliant, then an alert is generated and also a fix is suggested which is derived from the rule. If the configuration change or change event is compliant, then the validation result details are recorded and maintained as history details.

In one embodiment, if an unauthorized change event is detected then the configuration change request is correlated with ticket database to check if a ticket has been logged for performing the change as indicated by the change event and if no ticket is found then an alert is raised for an unauthorized change.

In one embodiment, for each configuration change violation a fix is suggested or generated and a ticket is created in the ticket management system along with configuration change violation and suggested fix details. The suggested fix is one of automatic and manual, which is based on at least one of factors such as, but not limited to, restarting the network device, impact on other devices connected to the network, ripple-effect in the network, requirement of manual intervention and execution of fix which is either simple or complex.

Figure 3:
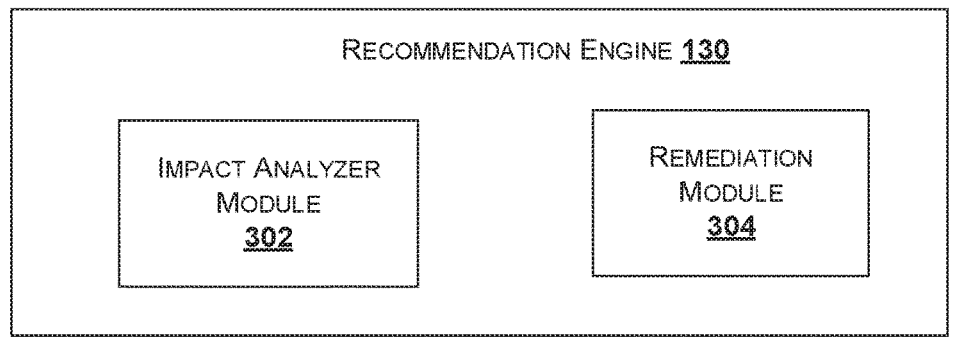
FIG. 3 illustrates an exemplary block diagram of a recommendation engine in accordance with some embodiments of the present disclosure.

The recommendation engine or module 130, receives each configuration change of a network device as one of a compliant configuration change and a non-compliant configuration change. The sub modules of the recommendation engine 130 are illustrated in FIG. 3. The sub modules of the recommendation engine 130 comprise an impact analyzer module 302 and a remediation module 304.

The impact analyzer module 302, also referred as analysis module, receives the alerts generated by the compliance module 128 as input and analyzes an impact of the compliance violation, in an exemplary embodiment of the present disclosure. The analysis module 302 analyzes the configuration changes using the first set of parameters and a third set of parameters to obtain a critical value associated with the one or more network devices. Thereafter, the analysis module 302 generates an impact value based on at least one of the critical value, a violation severity value, or a probability of vulnerability exploited by one or more malicious elements. The third set of parameters is at least one of network connectivity, neighboring devices configuration, network device having internal facing or external facing and enrooting a network device to provide critical business services.

In one embodiment, the impact analyzer module 302 analyses impact of violation when a compliance change or violation is found and provide a rating based on at least one of severity of the configuration violation as defined in the database by organization security policy, criticality of the network device on which the configuration change was performed and correlating severity of violation and criticality of device to derive an impact of leaving the violation unfixed. The criticality is determined by at least one of role played by the device in network connectivity, which are the neighboring devices, whether the device is internal or external facing, and whether the device is enrooted to systems that provide critical business services.

The remediation module 304 generates a recommendation using historical data associated with one or more impact values of the one or more network devices. For this, the remediation module 304 analyzes a complexity of fixing the violation based on parameters such as, but not limited to restart a network device after configuration change, impact value associated with the configuration change on other devices in the network. Also, the remediation module 304 recommends at least one of fixing the violation manually and automatically. Further, the remediation module 304 provides a final suggestion based on an historical data associated with one or more impact values of the one or more network devices. Also, the remediation module 304 provides a summary of the impact based on similar configuration changes and recommends an optimal change to be performed on the network device.

Following is an example embodiment illustrating configuration change event processing by compliance validation and recommendation engines.

Let the configuration change event received is for specifying protocols allowed on individual lines for incoming traffic on VTY lines of a router. Let a command received be
   line vty 0 32
   transport input telnet Here, the network device is identified as a router of predefined operating system (OS) version and the command is identified as an attempt to perform one of setting and adding an input transport protocol to a set of already added protocols, wherein the input transport protocol is a telnet, in one embodiment. In another example, assuming that the policy specifies that no protocol other than SSH should be allowed. Then, the configuration change would be identified as non-compliant. If the severity of violation associated with the rule is high and criticality of the network device is also high, then the impact value computed is also high. In case, If the previously recorded authorized changes do not allow telnet transport, then the configuration change may be treated as transgression irrespective of whether the change is authorized or unauthorized. Since the impact is high, and the allowing telnet transportation protocol shall create a vulnerable spot in network, and an automatic fix shall be recommended.

Referring back to FIG. 1, the compliance management computing device 100 comprises an output module 132 to generate a report based on at least one of the identified configuration change, impact value and the recommendation. In one embodiment, the output module 132 provides at least one of recorded configuration change or event which is found to be compliant, recommendation for fixing the configuration change either manually or automatically, execution of suggested fix, if the suggested fix is automatic then executing the fix by ensuring the compliance of the device and generating one or more reports based on at least one of compliance violation, unauthorized change and a performance by a user of a network device.

Figure 4:
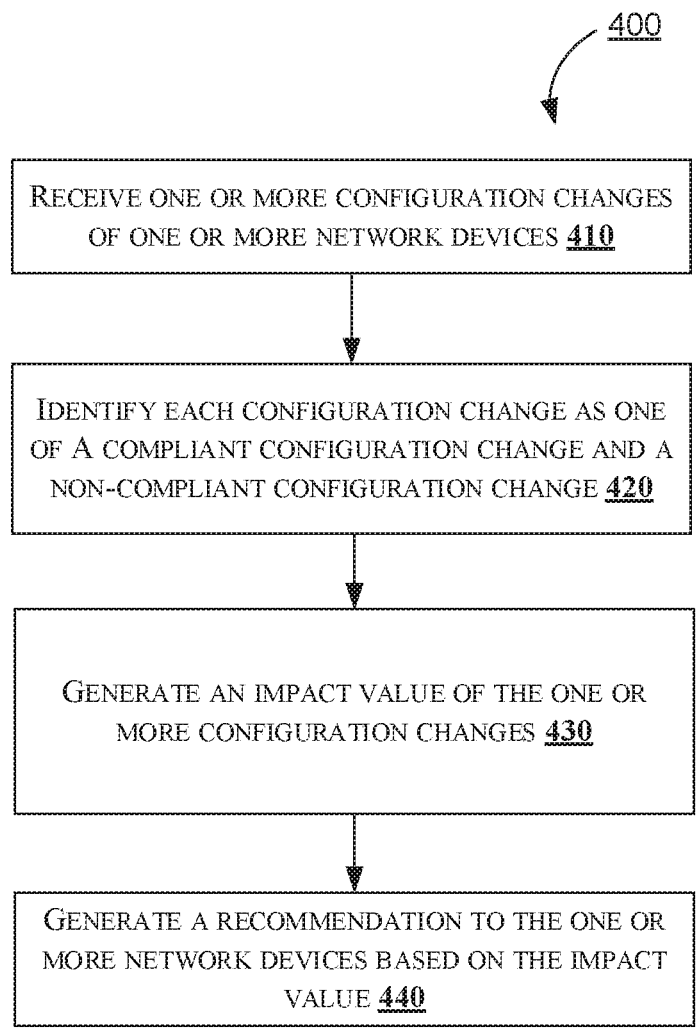
FIG. 4 shows a flowchart illustrating a method for managing compliance of one or more network devices in accordance with some embodiments of the present disclosure.

FIG. 4 shows a flowchart illustrating a method for managing compliance of one or more network devices in accordance with some embodiments of the present disclosure.

As illustrated in FIG. 4, the method 400 comprises one or more blocks for managing compliance of one or more network devices. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 410, receive the input data or configuration changes 114 from the one or more network devices or referred as network devices 102. In an embodiment, the input module 126 receives the configuration changes 114 from the network device 102. The input module 126 receives one or more configuration changes of the one or more network devices At block 420, identify each configuration change as one of a compliant configuration change and a non-compliant configuration change by correlating, the one or more configuration changes using a first set of parameters. The first set of parameters is at least one of make and model of the network device. The policy and rules module 202 identifies a configuration change as one of compliance and non-compliance configuration change.

At block 430, generate an impact value of the one or more configuration changes. In one embodiment, the recommendation engine 130 generates the impact value comprising, analyzing the configuration changes using the first set of parameters and a third set of parameters for obtaining a critical value associated with the one or more network devices and generating an impact value based on at least one of the critical value, a violation severity value, and a probability of vulnerability exploited by one or more malicious elements.

At block 440, generate a recommendation to the one or more network devices based on the impact value. In one embodiment, the recommendation engine 130 generates a recommendation using historical data associated with one or more impact values of the one or more network devices.

Thus, the method and the device for compliance managing of one or more network devices identifies whether a network device is one of compliance and non-compliance.

Computer System

Figure 5:
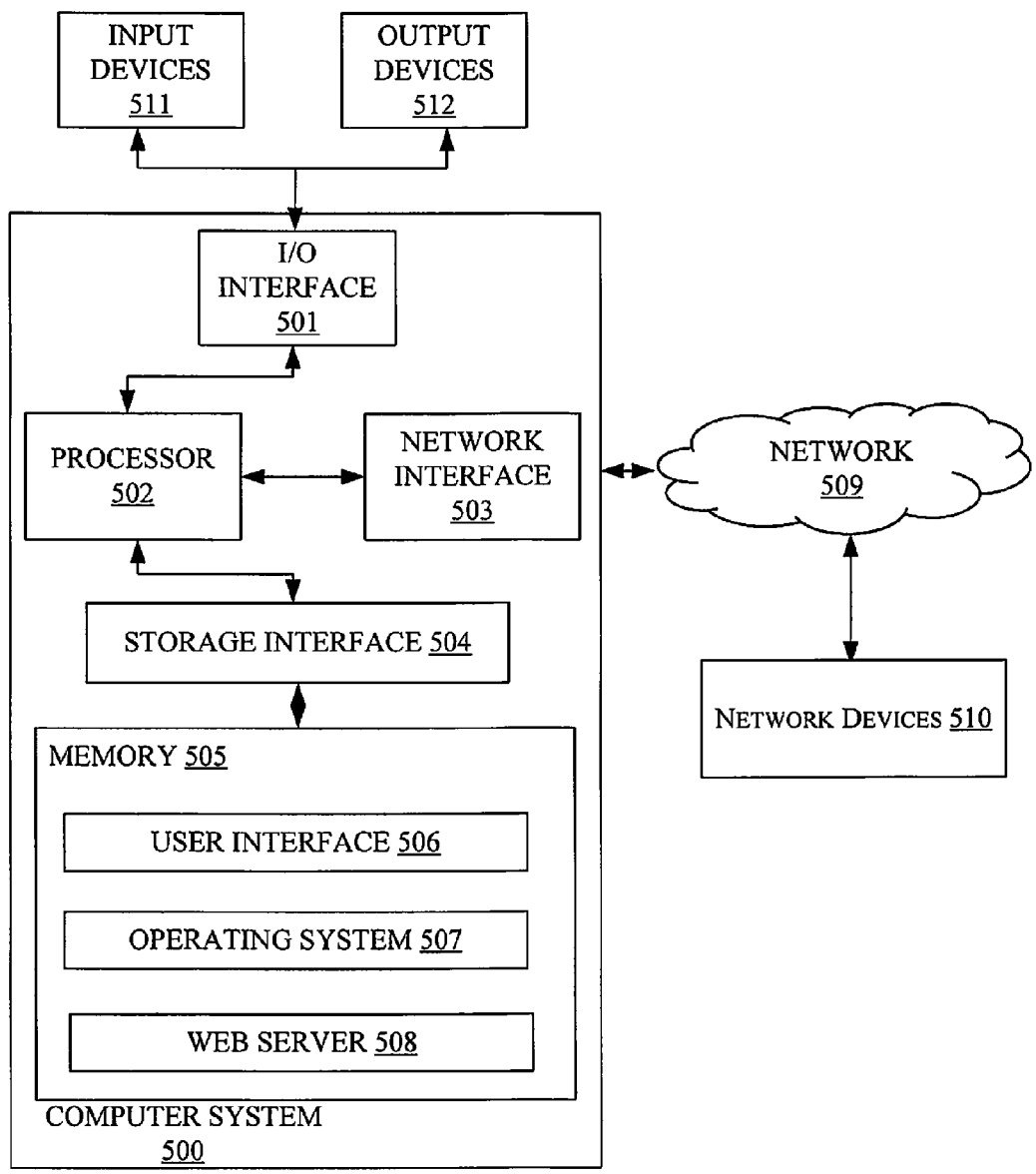
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the compliance management computing device 100. The computer system 500 is for managing compliance of one or more network devices. The computer system 500 may comprise a central processing unit ("CPU" or "processor") 502. The processor 502 may comprise at least one data processor for executing program components for executing user- or system-generated business processes. A user may include a person, a person using a device such as such as those included in this disclosure, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices (511 and 512). For example, the input device 511 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 512 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with one or more network devices 510.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface application 506, an operating system 507, web server 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

In an embodiment, the present disclosure provides real-time validation of one or more configuration changes and identification of compliance violations which helps in containing/preventing the possible damages from wrong/insecure configurations.

In an embodiment, the present disclosure provides identification of unauthorized changes helps in enforcing the change management policy in maintaining the network device configurations.

In an embodiment, the present disclosure provides intelligent recommendations for fixing violations or configuration changes that not only consider the industry best practices or organization security policy, but also positive/adverse impact of previously executed similar changes.

In an embodiment, the present disclosure provides a recommendation for an automatic or manual fixing and integration with change management system helps in tracking the violations to closure.

In an embodiment, the present disclosure provides a provision for an automatic fixing of violations which enables quick fixing of a sub-set of violations.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustra-

REFERRAL NUMERALS

| Reference Number | Description |
| --- | --- |
| 100 | Compliance management computing device |
| 102 | Network devices |
| 104 | Processor |
| 106 | Interface |
| 108 | Memory |
| 110 | Data |
| 112 | Modules |
| 114 | Input Data |
| 116 | Baseline Guidelines Data |
| 118 | Compliance Data |
| 120 | Impact Value |
| 122 | Recommendation Data |
| 124 | Other Data |
| 126 | Input Module |
| 128 | Compliance Module |
| 130 | Recommendation Engine |
| 132 | Output Module |
| 134 | Others Modules |
| 202 | Policy and Rules Module |
| 204 | Change Authorization Detect Module |
| 302 | Impact Analyzer |
| 304 | Remediation Module |
| 500 | Computer System |
| 501 | I/O Interface |
| 502 | Processor |
| 503 | Network Interface |
| 504 | Storage Interface |
| 505 | Memory |
| 506 | User Interface Application |
| 507 | Operating System |
| 508 | Web Browser |
| 510 | Network Devices |
| 511 | Input Device |
| 512 | Output Device |

We claim:

1. A method for managing compliance of one or more network devices, comprising:
receiving, by a compliance management computing device, one or more configuration changes of the one or more network devices;
identifying, by the compliance management computing device, each configuration change as one of a compliant configuration change and a non-compliant configuration change by correlating the one or more configuration changes using a first set of parameters;
generating, by the compliance management computing device, an impact value of the one or more configuration changes, wherein the generation of the impact value comprises:
obtaining a critical value associated with the one or more network devices by analyzing the configuration changes using the first set of parameters and a third set of parameters; and
providing a rating based on the critical value, a violation severity value, or a probability of vulnerability exploited by one or more malicious elements, wherein the impact value corresponds to the rating; and
generating, by the compliance management computing device, a recommendation for the one or more network devices based on the impact value.

2. The method as claimed in claim 1, wherein each of the one or more configuration changes is associated with at least one of a configuration change identifier, an actual command executed, time of the configuration change and originator of the configuration change.

3. The method as claimed in claim 1 further comprising receiving, by a compliance management computing device, a second set of parameters associated with at least one of an organization security policy and baseline guideline rules corresponding to the one or more network devices.

4. The method as claimed in claim 3 further comprising identifying each of the one or more configuration changes as one of compliant configuration change and non-compliant configuration change by validating the one or more configuration changes using the second set of parameters.

5. The method as claimed in claim 4 further comprising verifying the validated one or more configuration changes and generating an alert if the configuration change is validated as non-compliant configuration change.

6. The method as claimed in claim 1, wherein the third set of parameters is at least one of network connectivity, neighboring devices configuration, network device having internal facing or external facing and enrooting a network device to provide critical business services.

7. The method as claimed in claim 1 further comprising generating a recommendation using historical data associated with one or more impact values of the one or more network devices.

8. The method as claimed in claim 7 further comprising generating, by the compliance management computing device, a report based on at least one of the identified configuration change, the impact value, and the recommendation.

9. The method as claimed in claim 1 further comprising identifying a configuration change from the one or more configuration changes as an unauthorized change based on correlation of at least one ticket raised for the configuration change with actual configuration change.

10. A compliance management computing device for managing compliance of one or more network devices, comprising:
a processor; and
a memory communicatively coupled to the processor, wherein the memory stores processor-executable instructions, which, on execution, causes the processor to:
receive one or more configuration changes of the one or more network devices;
identify each configuration change as one of a compliant configuration change and a non-compliant configuration change by correlating the one or more configuration changes using a first set of parameters;
generate an impact value of the one or more configuration changes, wherein the generation of the impact value causes the processor to:
obtain a critical value associated with the one or more network devices by analyzing the configuration changes using the first set of parameters and a third set of parameters; and
provide a rating based on the critical value, a violation severity value, or a probability of vulnerability exploited by one or more malicious elements, wherein the impact value corresponds to the rating; and
generate a recommendation to the one or more network devices based on the impact value.

11. The device as claimed in claim 10, wherein each of the one or more configuration changes is associated with at least one of configuration identifier, an actual command executed, time of the configuration change and originator of the configuration change.

12. The device as claimed in claim 10 further comprising the processor configured to receiving a second set of parameters associated with at least one of an organization security policy and baseline guideline rules corresponding to the one or more network devices.

13. The device as claimed in claim 12, wherein the processor is further configured to identifying each of the one or more configuration changes as one of compliant configuration change and non-compliant configuration change by validating the one or more configuration changes using the second set of parameters.

14. The device as claimed in claim 13, wherein the processor is further configured to verify the validated one or more configuration changes and generate an alert if the configuration change is validated as non-compliant configuration change.

15. The device as claimed in claim 10, wherein the third set of parameters is at least one of network connectivity, neighboring devices configuration, network device having internal facing or external facing and enrooting a network device to provide critical business services.

16. The device as claimed in claim 10 further comprises the processor configured to generate a recommendation using historical data associated with one or more impact values of the one or more network devices.

17. The device as claimed in claim 16 further comprises the processor configured to generate a report based on at least one of the identified configuration change, the impact value, and the recommendation.

18. The device as claimed in claim 10, wherein the processor is further configured to identifying a configuration change from the one or more configuration changes as an unauthorized change based on correlation of at least one ticket raised for the configuration change with actual configuration change.

19. A non-transitory computer readable medium including instructions stored thereon that when processed by at least one processor cause a system to perform operations comprising:
- receive one or more configuration changes of the one or more network devices;
- identify each configuration change as one of a compliant configuration change and a non-compliant configuration change by correlating the one or more configuration changes using a first set of parameters;
- generate an impact value of the one or more configuration changes, wherein the generation of the impact value causes the system to:
  - obtain a critical value associated with the one or more network devices by analyzing the configuration changes using the first set of parameters and a third set of parameters; and
  - provide a rating based on the critical value, a violation severity value, or a probability of vulnerability exploited by one or more malicious elements, wherein the impact value corresponds to the rating; and
- generate a recommendation for the one or more network devices based on the impact value.

* * * * *